US006298795B1

(12) United States Patent
Suer

(10) Patent No.: US 6,298,795 B1
(45) Date of Patent: Oct. 9, 2001

(54) MOUNTING DEVICE FOR THE MOVABLE PART OF A COOLING OR HEATING GRATE

(76) Inventor: Ulrich Suer, Brunnenstrasse 27, 31547 Rehburg (DE)

(*) Notice: Subject to any disclaimer, the term of this patent is extended or adjusted under 35 U.S.C. 154(b) by 0 days.

(21) Appl. No.: 09/380,815

(22) PCT Filed: Mar. 12, 1998

(86) PCT No.: PCT/EP98/01450

§ 371 Date: Sep. 8, 1999

§ 102(e) Date: Sep. 8, 1999

(87) PCT Pub. No.: WO98/40683

PCT Pub. Date: Sep. 17, 1998

(30) Foreign Application Priority Data

Mar. 13, 1997 (DE) .............................................. 197 10 332
Oct. 10, 1997 (DE) .............................................. 197 44 903

(51) Int. Cl.[7] .............................. F23H 17/00; F16F 1/18; B60G 11/02

(52) U.S. Cl. .......................... 110/274; 110/327; 110/268; 267/160; 126/180

(58) Field of Search .................................... 110/274, 278, 110/268, 327, 328; 126/174, 175, 180; 267/160, 41

(56) References Cited

U.S. PATENT DOCUMENTS 2,793,028 * 5/1957 Wheeler .................................. 267/1
3,581,684 * 6/1971 Nobelius ............................... 110/39
4,121,708 * 10/1978 Benson et al. ....................... 198/766
4,239,029 * 12/1980 Martin et al. .................... 126/163 R
4,389,978 * 6/1983 Northcote ............................ 122/4 D
4,538,882 * 9/1985 Tanaka et al. ....................... 350/255
4,927,124 * 5/1990 Spedding et al. .................... 267/229
4,966,548 10/1990 von Wedel ............................ 432/77
5,584,686 * 12/1996 Nielsen ................................ 432/77
5,785,303 * 7/1998 Kutschi ............................... 267/103

FOREIGN PATENT DOCUMENTS 1017072 10/1957 (DE) .
1286816 1/1969 (DE) .
9012811 11/1990 (DE) .
4132475 4/1993 (DE) .
4417422 11/1995 (DE) .
497546 9/1919 (FR) .

* cited by examiner

*Primary Examiner*—Denise L. Ferensic
*Assistant Examiner*—K. B. Rinehart

(57) ABSTRACT

A mounting device for supporting the movable part of a cooling or heating grate, while permitting the movable part to oscillate in the feed direction. The mounting device comprises a plurality of leaf springs connected by transmission members. The upper and lower ends of the leaf springs are alternately attached to transmission members to form symmetrical N-shaped assemblies in which lateral movement is permitted by equal deflections of the leaf springs.

8 Claims, 2 Drawing Sheets

MOUNTING DEVICE FOR THE MOVABLE PART OF A COOLING OR HEATING GRATE

CROSS REFERENCE TO RELATED APPLICATION

This is the national stage of International Application No. PCT/EP98/01450 filed Mar. 12, 1998.

BACKGROUND OF THE INVENTION

Feeder grates, which are used as cooling grates or firing grates, consist alternately of stationary grate plates and transverse rows fo grate plates which can be moved forward and back in the feed direction. The rows of movable grate plates are supported, in total or in groups, by a movably mounted frame. Track rollers, which roll on a rail, are used for support. They are subject to high wear, which leads to an undesirable lowering of the movable grate plate rows relative to the stationary rows. It has been proposed (DE-C-38 44 493) to avoid this by support appliances which comprise a leaf spring on which the movable part of the grate is suspended so that it can oscillate. These support appliances have the disadvantage that the leaf springs must have a very long configuration so that the vertical component of the oscillating motion remains negligibly small. It is not only the space requirement associated with the great length of the leaf springs but also their large thermal expansion which causes difficulty. This thermal expansion leads to a lowering of the grate part and therefore affects the mutual positional relationship between the stationary and moving rows of grate plates.

SUMMARY OF THE INVENTION

The invention is based on the object of creating a supporting arrangement, which has a smaller space requirement and in which the change in position of the moving grate plates due to thermal expansion of the leaf springs is reduced.

This is achieved, in accordance with the invention by providing a plurality of leaf springs arranged adjacent to one another in such a way that in each case forces from the lower end of one leaf spring are transmitted into the upper suspension point of an adjacent leaf spring, on whose lower end the grate plate can be or is fastened. This gives an N or zigzag-type arrangement of the leaf springs and the members which transmit the force from the lower end of one leaf spring to the upper suspension end of the other leaf spring. As compared with the length of the leaf springs of known suspension arrangements, this length is subdivided among a plurality of leaf springs. The same movement distance is achieved with correspondingly less vertical expansion of the support appliance. The effective length with respect to thermal expansion is also correspondingly reduced, so that there is a corresponding reduction in the thermal expansion error in the positioning of the moving grate plate rows relative to the stationary grate plate rows.

It is expedient to connect more than two leaf springs together in the manner given so that the motion path necessary in total is distributed among more than two leaf springs. In consequence, the height of the appliance can be further reduced.

A particularly advantageous arrangement is one in which that leaf spring, on whose lower end the grate plate is to be fastened, is arranged between a pair of leaf springs holding it. A leaf spring, from whose lower end the forces are transmitted to the upper suspension end of the leaf spring first mentioned, is therefore located on each side of the leaf spring on which the grate plate is suspended.

A larger number of further leaf springs can be provided on both sides of the leaf spring which directly carries the grate plate, so that the movement distance is divided among a plurality of pairs of leaf springs.

In accordance with a special feature of the invention, those members which transmit the force from the pair of adjacent leaf springs to the upper suspension point of the spring carrying the moving grate plate are rigidly connected together. This also applies to the following pair, if present. It is expedient for the arrangement to be symmetrical.

The member which respectively transmits the force from the lower end of one leaf spring to the upper suspension point of another leaf spring can extend obliquely to the (vertical) direction of the leaf springs. It is, however, also possible to have a parallel arrangement of the leaf springs and the members connecting them.

Leaf springs packs, i.e. arrangement of springs which are jointly subject to the same loading and which deform jointly in parallel are also to be understood as being included in the concept of leaf springs.

The support appliance is expediently arranged in a special casing to protect it against mechanical and thermal effects. Thus the appliance can also be arranged within the cooler or firing casing.

The invention is explained in more detail below with reference to the drawing, which illustrates advantageous exemplary embodiments examples, and in which:

BREIF DESCRIPTION OF THE DRAWINGS

DESCRIPTION OF A PREFERRED EMBODIMENT

Figure 1:
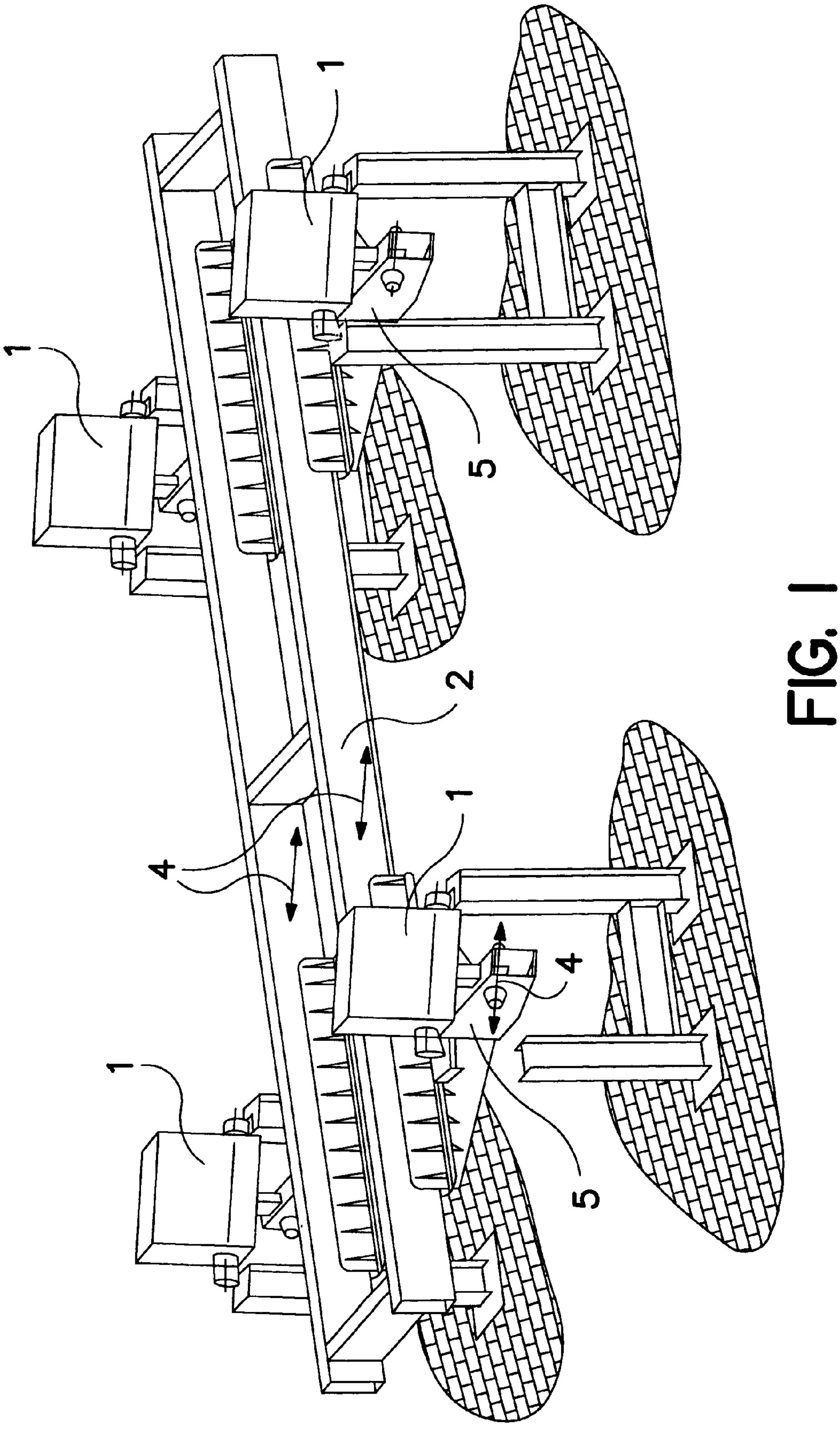
FIG. 1 shows a perspective overall view.

As shown in FIG. 1, the movable frame 2 of a grate cooler, whose grate plates and stationary parts are omitted for ease of comprehension, is carried by four support appliances in casings 1. For this purpose, transverse beams 5 are arranged on the fame and their ends are suspended on the support appliances. The support appliances can be integrated into the cooler casing or guide casing. It is also possible to install them near (outside) the cooler or furnace casing. More than the four support appliances indicated can also, of course, be employed.

Figure 2:
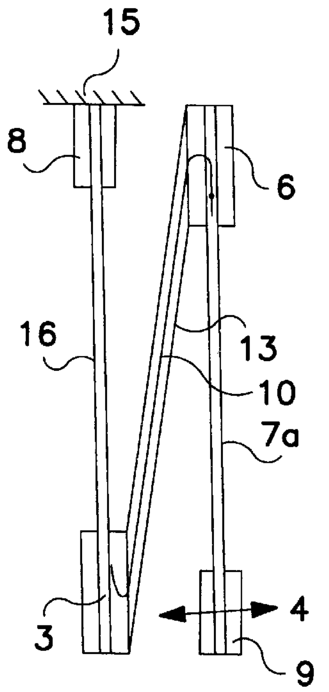
FIGS. 2 to 5 show different embodiments of the support appliance.

FIG. 2 shows the simplest configuration of a support appliance. The upper end of a first leaf spring **7*b* is fastened to a fixed structure 15. The force accepted by the lower end 3 of this leaf spring is transmitted therefrom, as shown by the arrow 10, to the point 6 at which is suspended a second leaf spring 7*a*, whose lower end 9 is connected to the part of the grate to be supported. A horizontal deflection 4 of the point 9 leads to corresponding bending of the leaf springs, 7*a*, 7*b*, each of these springs providing half of the total amount of deflection. The arrangement is N-shaped, the leaf springs 7*a*, 7*b* forming the vertical members, whose opposite ends are connected by a connecting member 13. This can extend obliquely—as is shown in FIG. 2. It can, however, also be arranged to be parallel to the leaf springs 7*a*, 7*b***.

Figure 4:
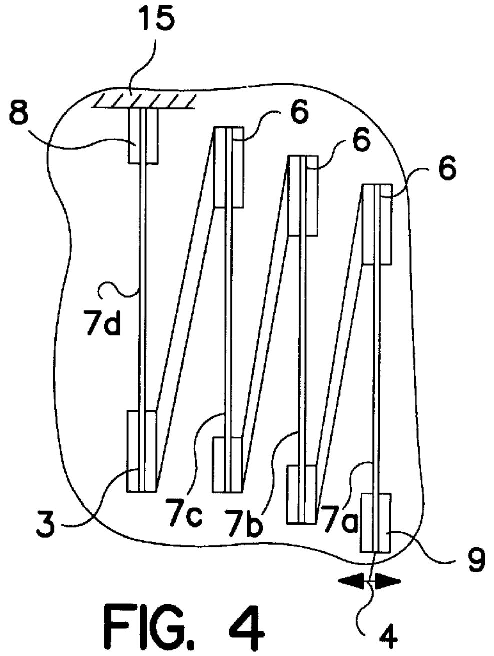

FIG. 4 shows the element of FIG. 2 in triple series connection, i.e. four leaf springs **7*a* to 7*d* are provided, respectively following leaf springs being connected together by means of members 13. The total path of motion 4** is therefore divided among four leaf springs.

Figure 3:
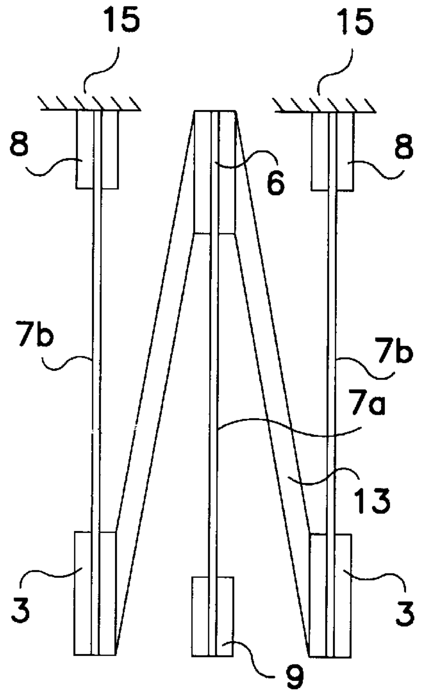

FIG. 3 shows a support appliance in which the arrangement of FIG. 2 is arranged symmetrically on both sides. The leaf spring 7*a*, whose lower end 9 is connected to the moving grate part, is supported at its upper end 6 by two leaf springs 7*b* which are arranged with mirror symmetry, whose upper ends 8 are anchored on a fixed structure 15 (not represented in any more detail) and whose tensile force is transmitted via members 13 from their lower ends 3 to the upper end 6 of the leaf spring 7*a*.

The transmission members 13 can be rigidly connected together by their upper flanges (which clamp between them the upper end of the leaf spring 7*a*) being firmly bolted together. Instead of or in addition to this, their lower ends 3 can also be connected together—without impairing the freedom of movement of the lower end 9 of the leaf spring 7*a*. The two connecting members 13 can also be formed from a single piece. The stability of the appliance is improved by the connection.

Figure 5:
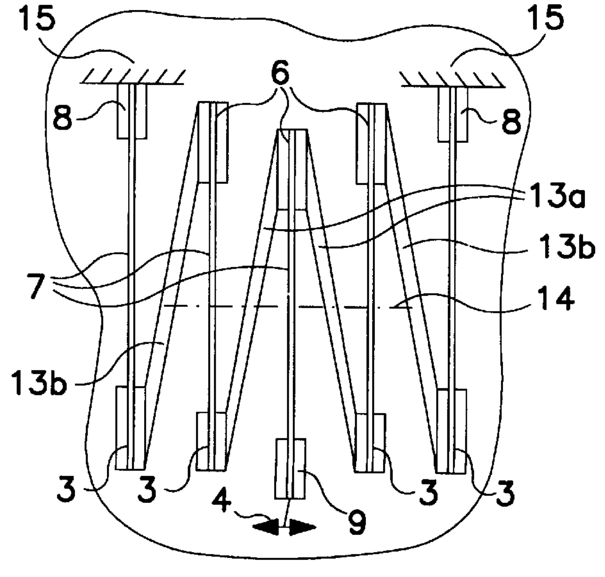

FIG. 5 shows a support appliance which—by analogy with the configuration of FIG. 3—is based on a symmetrical support of the leaf spring 7*a* on both sides, this leaf spring 7*a* being connected at its lower end 9 to the movable grate part. As compared with the configuration of FIG. 3, the path of movement 4 is divided among a larger number of leaf springs, so that it is possible to select a lower installation height in relation to the path of motion.

In this connection also, the stability can be improved by the coupling in pairs of correspondingly located connecting members. For the connecting elements 13*a*, what has been stated above with respect to FIG. 4 applies. The connecting elements 13*b* can, for example, be rigidly connected together by means of a coupling rod (indicated at 14 by chain-dotting) without impairing the movement capability of the other intermediate members of the support appliance.

The support appliances represented are comparable with link mechanisms in which the links are replaced by spring members.

Figure 6:
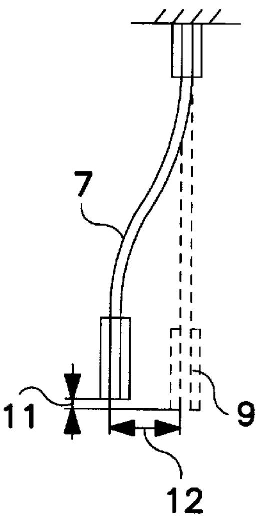
FIG. 6 shows the height offset in the case of conventional support.

FIG. 6 shows the height offset during the lateral deflection of a leaf spring suspension. If the lower, clamped end 9 of the leaf spring—shown in the rest condition by an interrupted line—is deflected, in the manner shown by full lines, by the amount 12 relative to the upper, likewise clamped, end of the leaf spring, the lower end is raised by the amount 11. If the deflection is divided among a plurality of leaf springs connected in series in accordance with the invention, the height offset is correspondingly reduced.

As is indicated in FIG. 6, in the configurations of FIGS. 2 to 5, as well, the ends of the leaf springs are also clamped between the flanges, rigidly connected together, of the transmission members 13 of represented flanges. This is not, however, absolutely necessary.

What is claimed is:

1. A support appliance for the support of a moving part of a cooling or firing grate, said support appliance comprising:

at least first and second leaf springs, each having a lower end and an upper suspension point;

at least one transmission member connecting the lower end of said first leaf spring to the upper suspension point of said second leaf spring, wherein said first leaf spring upper suspension point is anchored to a fixed structure and the moving part is attachable to the lower end of said second leaf spring, whereby forces exerted on the lower end of said second leaf spring by movement of the moving part are transmitted to said first leaf spring by said transmission member and the movement of the moving part is absorbed by deflection of both first and second leaf springs relative to said fixed structure.

2. The support appliance of claim 1, wherein said at least first and second leaf springs comprise a plurality of leaf springs and said at least one transmission member comprise a plurality of transmission members, said transmission members connecting said leaf springs in a series with each said transmission member connecting the lower end of a previous leaf spring to the upper suspension point of a following leaf spring, with the moving part attached to the lower end of a final leaf spring in the series, whereby forces exerted on the lower end of the final leaf spring in the series are transmitted to previous leaf springs in the series and movement of the moving part is permitted by deflection of substantially all said plurality of leaf springs.

3. The support appliance of claim 1, wherein said support appliance is arranged in a special casing, said special casing protecting said support appliance from heat and contamination by particulate matter.

4. A support appliance for a moving part of a cooling or firing grate, said support appliance comprising:

a symmetrical arrangement of leaf springs including at least a first leaf spring, a middle leaf spring and a last leaf spring, each said leaf spring including an upper suspension point and a lower end, and at least two transmission members connecting the lower end of said first and last leaf springs to the upper suspension point of said middle leaf spring, wherein the upper suspension point of said first and last leaf springs are anchored to a fixed structure and the moving part is attachable to the lower end of said middle leaf spring, whereby forces exerted on the lower end of said middle leaf spring are transmitted to said first and last leaf springs by said transmission members and movement of the moving part is absorbed by deflection of said first, middle and last leaf springs relative to said fixed structure.

5. The support appliance of claim 4, wherein said at least two transmission members are rigidly connected together.

6. The support appliance of claim 4, wherein said leaf springs include a plurality of leaf springs and said at least two transmission members include a plurality of transmission members, said plurality of leaf springs and plurality of transmission members arranged so that a transmission member connects the lower end of said first leaf spring to the upper suspension point of a following leaf spring and a transmission member connects the lower end of said last leaf spring to the upper suspension point of a previous leaf spring, forming a symmetrical pattern in which the middle leaf spring is suspended at the upper suspension point between two transmission members.

7. The support appliance of claim 6, wherein said transmission members are rigidly connected together.

8. The support appliance of claim 4, wherein said support appliance is arranged in a special casing, said special casing protecting said support appliance from heat and contamination by particulate matter.

* * * * *

UNITED STATES PATENT AND TRADEMARK OFFICE

CERTIFICATE OF CORRECTION

PATENT NO. : 6,298,795 B1
APPLICATION NO. : 09/380815
DATED : October 9, 2001
INVENTOR(S) : Suer It is certified that error appears in the above-identified patent and that said Letters Patent is hereby corrected as shown below:

On the first page delete:

" (76) Inventor: Ulrich Suer, Brunnenstrasse 27, 31547 Rehburg (DE)"

and insert:

-- (75) Inventor: Ulrich Suer, Brunnenstrasse 27, 31547 Rehburg (DE)

(73) Assignee: BMH Claudius Peters AG, Buxtehude, Fed Rep Germany--

Signed and Sealed this

Fifth Day of December, 2006

JON W. DUDAS

*Director of the United States Patent and Trademark Office*